(12) United States Patent
Gaitonde

(10) Patent No.: US 7,629,037 B2
(45) Date of Patent: Dec. 8, 2009

(54) AIRCRAFT STRUCTURAL COMPONENTS

(75) Inventor: John M. Gaitonde, Filton (GB)

(73) Assignee: Airbus UK Limited, Bristol (GB)

( * ) Notice: Subject to any disclaimer, the term of this patent is extended or adjusted under 35 U.S.C. 154(b) by 940 days.

(21) Appl. No.: 10/484,425

(22) PCT Filed: Jul. 11, 2002

(86) PCT No.: PCT/GB02/03202

§ 371 (c)(1),
(2), (4) Date: Jan. 21, 2004

(87) PCT Pub. No.: WO03/022678

PCT Pub. Date: Mar. 20, 2003

(65) Prior Publication Data

US 2004/0161585 A1    Aug. 19, 2004

(30) Foreign Application Priority Data

Jul. 21, 2001  (GB)  ................................. 0117804.5

(51) Int. Cl.
*B32B 3/10* (2006.01)
(52) U.S. Cl. ..................... 428/131; 244/123.1
(58) Field of Classification Search ............... 428/131, 428/137; 244/123.1
See application file for complete search history.

(56) References Cited

U.S. PATENT DOCUMENTS

| 3,260,398 | A | | 7/1966 | Levenetz |
| 3,946,127 | A | | 3/1976 | Eisenmann et al. |
| 5,452,867 | A | | 9/1995 | Grunwald et al. |
| 5,914,163 | A | * | 6/1999 | Browne ............... 428/36.1 |

FOREIGN PATENT DOCUMENTS

| DE | 199 25 953 | 9/2000 |
| WO | WO 00/24553 | 5/2000 |
| WO | WO 01/58680 | 8/2001 |

* cited by examiner

*Primary Examiner*—Alicia Chevalier
(74) *Attorney, Agent, or Firm*—Nixon & Vanderhye P.C.

(57) ABSTRACT

A structural component such as a wing skin for an aircraft is formed generally of a first composite fiber and matrix material exhibiting a first tensile modulus in respect of tensile stress and a first tolerance of strain resulting from such stress. One or more openings are provided in the component and the material of a portion of the component bounding the opening(s) is a second composite fiber and matrix material. The second material exhibits a second tensile modulus in respect of tensile stress that is smaller than the first tensile modulus of the first material and a second tolerance of strain resulting from such stress that is greater than the first tolerance of strain of the first material.

28 Claims, 1 Drawing Sheet

AIRCRAFT STRUCTURAL COMPONENTS

This is the U.S. national phase of international application PCT/GB02/03202 filed Jul. 11,2002 which designate the U.S., the entire contents of which are hereby incorporated by reference.

BACKGROUND OF THE INVENTION

1. Field of the Invention

This invention relates generally to the construction of structural components of an aircraft. The invention has particular significance to the behaviour of structural components when subjected to tensile stress and is therefore especially relevant to structural components that are subjected to tensile stress during normal use. The invention is particularly, but not exclusively, directed to a lower wing skin for an aircraft, and to an aircraft wing structure and an aircraft including such a lower wing skin. As is well known, lower wing skins of aircraft are subjected to tensile stress during normal flight conditions.

2. Discussion of Prior Art

It is commonly desired to provide openings in wing skins, for example, to enable the interiors of wings to be inspected. Such openings are commonly relatively large, that is more than $10^4 mm^2$ in area, and are referred to herein as "manholes", a common purpose of such openings being to enable a person to insert their head and/or hands through the openings.

SUMMARY OF THE INVENTION

It is commonly desired to provide openings in wing skins, for example, to enable the interiors of wings to be inspected. Such openings are commonly relatively large, that is more than 104 mm² in area, and are referred to herein as "manholes", a common purpose of such openings being to enable a person to insert their head and/or hands through the openings.

Such manholes may be provided in the upper or lower wing skins of a wing structure. The structural considerations are rather different for the upper and lower wing skins because during normal flight the upper wing skin is required, inter alia, to withstand longitudinal compressive forces while the lower wing skin is required, inter alia, to withstand longitudinal tensile forces. A direction is referred to herein as being a "longitudinal" direction when it is along the length of the wing (approximately transverse to the direction of flying), that direction also being known as "spanwise".

A particular issue arises if it is desired to place a manhole in a lower wing skin formed of a composite fibre arid matrix material. A typical example of a fibre and matrix material that might be used for a lower wing skin is carbon fibres in a matrix material comprising an epoxy resin. The carbon fibres have an especially high tensile modulus (the tensile modulus of a material being the Young's modulus that it exhibits when tensioned) and it becomes possible to provide a relatively thin and, consequently, relatively light wing skin of the required strength. If, however, a manhole were to be placed in the lower wing skin formed of such a composite material, then, when during flight the lower wing skin is subjected to tension, especially high stresses would arise at the edge of the manhole, those stresses being accentuated in any region of damage to the skin around the opening. In response to the high stresses the material would incur extra strain which the composite material is well known as unable to withstand.

A way of avoiding the problem just referred to would be to thicken the wing skin across its entire width in the region of a manhole, but that adds weight to the wing skin and is likely to take away the potential weight advantage of using the composite material.

It is an object of the invention to provide a structural component of composite material for an aircraft, with one or more openings in the component, without unduly weakening the ability of the component to withstand tensile stress.

According to the invention there is provided a structural component for an aircraft, the component being formed generally of a first composite fibre and matrix material exhibiting a first tensile modulus in respect of tensile stress and a first tolerance of strain resulting from such stress, wherein an opening is provided in the component and the material of a portion of the component bounding the opening is a second composite fibre and matrix material exhibiting a second tensile modulus in respect of tensile stress that is smaller than the first tensile modulus of the first composite fibre and matrix material and a second tolerance of strain resulting from such stress that is greater than the first tolerance of strain of the first composite fibre and matrix material.

Whilst the inclusion of a material of a relatively small tensile modulus might appear clearly disadvantageous in a structural component, for example, a lower wing skin, that is to be subject to high tensile stresses during normal use, we have found that it can be beneficial both in reducing the exceptionally high stresses that are likely to arise around an opening provided in the component and in enabling the component to withstand higher longitudinal strains. Thus it is an important feature of the present invention that the second composite fibre and resin material has both a smaller tensile modulus and a greater tolerance of strain, the tolerance of strain being the amount of strain that can be tolerated prior to failure of the material, failure being the point at which the material is no longer capable of fulfilling its intended purpose.

Preferably the first composite fibre and matrix material includes fibres of a first type and the second composite fibre and matrix material includes fibres of a second type, the fibres of the second type having a tensile modulus smaller than the tensile modulus of the fibres of the first type and having a tolerance of strain greater than the fibres of the first type.

Preferably the second composite fibre and matrix material includes both fibres of the first type and fibres of the second type. Preferably the second composite material includes a plurality of layers of fibres and fibres of the second type are present in only some of the layers. Preferably the second composite material includes fibres extending in a plurality of different directions and fibres of the second type all extend in the same direction. The fibres of the second type preferably extend in a direction in which substantial tensile stress is expected to arise, so that for example in the case of a lower wing skin the fibres of the second type preferably extend in the longitudinal direction. It is preferred that all or substantially all the fibres of the first type extend in directions other than the direction in which the fibres of the second type extend. It will be understood that because different fibres may extend in different directions the tensile modulus may be different in different directions and where reference is made to a smaller tensile modulus or a greater tolerance of strain that is referring to such a feature being present in at least one direction, but not necessarily, or indeed usually, in all directions. It will also be understood that there may be a gradual transition in the composition of the fibre and matrix material from the composition of the first fibre and matrix material to the composition of the second fibre and matrix material. The fibres of the first type are preferably carbon fibres and the fibres of the second type are preferably glass fibres.

Preferably the second composite fibre and matrix material surrounds the opening.

Preferably the thickness of the portion of the component formed of the second composite fibre and matrix material is substantially the same as the thickness of the neighbouring portion of the component formed of the first composite fibre and matrix material. In particular regions, for example in a region where the component is joined to another structural component, for example a spar of a wing structure, it may be desirable to thicken the component.

If an opening in a component is sufficiently small then the structural considerations are rather different and the demands less severe. The present invention is of particular advantage in a case where the opening in the structural component has a smallest dimension greater than 25mm and/or an area greater than 600mm$^2$; usually the opening will have an area greater than 10$^4$mm$^2$ and the second composite fibre and matrix material will extend across a width greater than 400mm.

The invention is of particular advantage in the case where the structural component forms at least a part of the skin of the aircraft, especially where the structural component is a lower wing skin and the opening is a manhole. The lower wing skin of an aircraft is subjected to high tensile stresses in the longitudinal direction during normal flight. The second composite fibre and matrix material preferably extends transversely outwardly from the manhole partway towards edges of the wing skin.

Preferably a plurality of manholes are provided, each bounded by the second composite fibre and matrix material. A single region of the second composite fibre and matrix material may encompass a plurality of manholes and/or separate regions of the second composite fibre and matrix material may encompass respective manholes.

According to the invention there is further provided an aircraft wing structure including a lower wing skin as defined above, and there is also further provided an aircraft including such a wing structure or a structural component as defined above.

BRIEF DESCRIPTION OF THE DRAWINGS

The invention is described further, by way of example, with reference to the accompanying drawings, in which.

DETAILED DISCUSSION OF EMBODIMENTS

Figure 1:
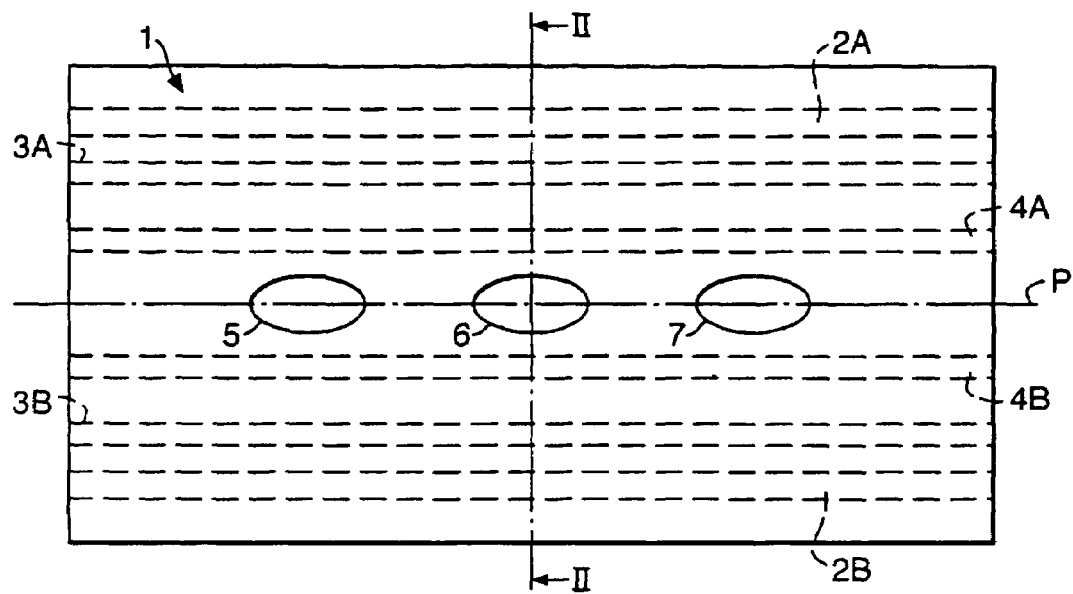
FIG. 1 is a plan view of a section of a lower wing skin and associated wing structure.

In the drawings the wing skin 1 is shown as flat, but it will be understood that in practice the wing skin will incorporate an aerodynamic curve, the radius of which would typically be of the order of 6 m.

Figure 2:
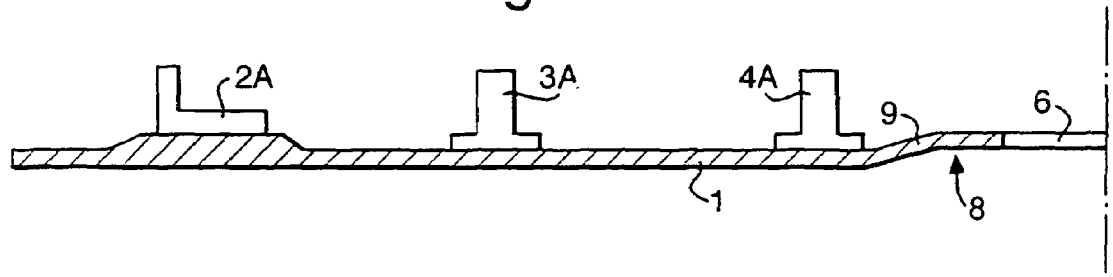
FIG. 2 is a sectional view along the lines II-II of FIG. 1 of one half of the lower wing skin and associated structure.

The wing structure shown in FIGS. 1 and 2 is conventional and in this example, comprises a pair of spars 2A and 2B in the region of the leading and trailing edges of the wing and stringers 3A and 3B and 4A and 4B extending along the wing skin inside the spars 2A and 2B. No ribs are shown in FIGS. 1 and 2 but it should be understood that there may also be one or more ribs present. As will be understood, the wing structure of the example shown in FIGS. 1 and 2 is symmetrical about a longitudinal vertical plane marked P in FIG. 1. Suffix A is used to designate parts on one side of the plane P and suffix B to designate the corresponding part on the opposite side of the plane P.

Along the length of the wing structure shown in FIGS. 1 and 2 three manholes 5, 6 and 7, each of the same elliptical shape and size, are provided. As shown for the manhole 6 in FIG. 2, the wing skin 1 is offset inwardly in the region 9 immediately surrounding each manhole to provide a recess 8 on the outside of the wing skin where a manhole cover (not shown) can be placed over the manhole and have an outer face flush with the exterior face of the main part of the wing skin.

Typically the spars 2A and 2B would be bolted and the stringers 3A, 3B, 4A and 4B adhesively bonded to the wing skin 1 in a manner known per se.

The wing skin 1 is formed as a monolithic structure from first and second composite fibre and matrix materials. The first composite fibre and matrix material, which is employed in the regions of the leading and trailing edges of the wing skin comprises a series of plies of carbon fibres (for example, HTS or UTS fibres) set in epoxy resin material. With a given ply, all the fibres run in the same direction: in some plies that is the longitudinal direction (spanwise of the wing) which is commonly referred to as 0°; in other plies it is plus or minus 45° to that direction and in still other plies it is at 90° to that direction. Of course it should be understood that these ply directions are simply examples of a typical material and that many other directions of fibres may be employed. In a particular example of the invention there are 20 carbon fibre plies employing UTS carbon fibres in M36 resin making up the first composite fibre and matrix material of the wing skin 1 and they are in the following directions:

| Ply: | Direction: |
| --- | --- |
| 1 | +45° |
| 2 | −45° |
| 3 | 0° |
| 4 | 90° |
| 5 | 0° |
| 6 | 0° |
| 7 | +45° |
| 8 | −45° |
| 9 | 0° |
| 10 | 0° |
| 11 | 0° |
| 12 | 0° |
| 13 | −45° |
| 14 | +45° |
| 15 | 0° |
| 16 | 0° |
| 17 | 90° |
| 18 | 0° |
| 19 | −45° |
| 20 | +45° |

In the table above, the plies are numbered from one face of the wing skin to the other, so that plies 1 and 20 are on the two faces whilst plies 10 and 11 are in the middle of the wing skin.

In the region surrounding the manholes 5, 6 and 7, the same pattern of plies is present but some of the plies are formed of glass fibres (for example, E-glass fibres or S-glass fibres) rather than carbon fibres. In the particular example described plies 3, 5, 6, 9, 10, 11, 12, 15, 16 and 18 are all formed of E-glass fibres. Thus, in this particular example, all of the 0° fibres become glass fibres in the second composite fibre and matrix material.

The transition from the first composite material where all the fibres are carbon fibres to the second material where some of the carbon fibres are replaced by glass fibres is preferably a gradual one with different plies changing from carbon to glass at different positions. In the particular example described, a central region extending 250 mm to either side of the plane P is formed of the second composite fibre and matrix material and gradually the glass fibre plies of that material are replaced by the carbon fibre plies of the first material as the distance from the plane P increases. In the particular example the transition is as follows:

| Distance from plane P: | Plies that change from glass to carbon: |
|---|---|
| 250 | 5 and 16 |
| 256.25 | 10 and 11 |
| 262.5 | 3 and 18 |
| 268.75 | 9 and 11 |
| 275 | 6 and 15 |

For the particular example described above each manhole is in the shape of a true ellipse and other relevant dimensions are as follows:

| | |
|---|---|
| Thickness of each ply: | 0.25 mm |
| Thickness of wing skin: | 5 mm |
| Length of each manhole: | 457 mm |
| Width of each manhole: | 254 mm |
| Width of wing skin: | 1,420 mm |
| Centre to centre spacing of manholes: | 800 mm |

Also in the particular example described above, the central region of the wing skin is formed along the whole of its length of the second composite material allowing the longitudinal fibres to be continuous except where interrupted by the manholes. An alternative arrangement, however, would provide for a gradual transition in the longitudinal direction from the second material to the first material.

In tests on plain samples (a plain sample being one in which the transverse cross-section of the material is constant along the length of the sample and the sample is devoid of any openings), the tensile modulus in the longitudinal (0°) direction of the first composite material comprising exclusively carbon fibres was found to be 85.1 GPa and the tolerance of strain (strain to failure) 1.46%. In contrast, the tensile modulus in the longitudinal (0°) direction of the second composite material comprising exclusively glass fibres in the 0° direction was found to be 32.7 GPa and the tolerance of strain was found to be 2.24%. The significant reduction of tensile modulus in the region of the manholes 5, 6 and 7 is not especially disadvantageous because little of the overall tensile force in the lower wing skin will be transmitted through the region of the manholes; rather, most of the tensile forces will be transmitted along the outer regions of the skin. On the other hand the increase in tolerance of strain is of particular advantage because the resistance of the manhole itself and the resistance of any damage to the edge of the manhole both increase the tolerance of strain required in the region of the manholes compared to a region remote therefrom.

Whilst in the example described above, the structural component to which the invention is applied is the lower wing skin of an aircraft, it should be understood that the invention may be applied to other structural components such as the fuselage or the horizontal part of a tailplane.

The invention is particularly, but not exclusively, applicable to larger aircraft such as passenger carrying aircraft or freight carrying aircraft.

The invention claimed is:

1. A structural component for an aircraft, said component having at least a locally longitudinally planar feature, the component comprised of a first composite fibre and matrix material exhibiting a first tensile modulus, wherein an opening is provided in the locally longitudinally planar feature of the component and the material of a portion of the component bounding the opening is a second composite fibre and matrix material exhibiting a second tensile modulus, said second tensile modulus is smaller than the first tensile modulus, wherein said first composite fibre and matrix material includes fibres of a first type and the second composite fibre and matrix material includes fibres of a second type, the fibres of the second type having a tensile modulus smaller than the tensile modulus of the fibres of the first type.

2. A structural component according to claim 1, in which the second composite fibre and matrix material includes both fibres of the first type and fibres of the second type.

3. A structural component according to claim 1, in which the second composite material includes a plurality of layers of fibres, and fibres of the second type are present in only some of the layers.

4. A structural component according to claim 1, in which the second composite material includes fibres extending in a plurality of different directions and fibres of the second type all extend in the same direction.

5. A structural component according to claim 4, in which substantially all the fibres of the first type extend in directions other than the direction in which the fibres of the second type extend.

6. A structural component according to claim 1, in which the fibres of the first type are carbon fibres.

7. A structural component according to claim 1, in which the fibres of the second type are glass fibres.

8. A structural component according to claim 1, in which the second composite fibre and matrix material surrounds the opening.

9. A structural component according to claim 1, in which the thickness of the portion of the component formed of the second composite fibre and matrix material is substantially the same as the thickness of the neighbouring portion of the component formed of the first composite fibre and matrix material.

10. A structural component according to claim 1, in which the opening has an area greater than $10^4$ mm2 and the second composite fibre and matrix material extends across a width greater than 400 mm.

11. A structural component according to claim 1, in which the structural component is a lower wing skin and the opening is a manhole.

12. A structural component according to claim 11, in which the second composite fibre and matrix material extends transversely outwardly from the manhole partway towards edges of the wing skin.

13. A structural component according to claim 11, in which a plurality of manholes are provided, each bounded by the second composite fibre and matrix material.

14. An aircraft wing structure including a lower wing skin according to claim 11.

15. An aircraft including a structural component according to claim 1.

16. A lower lifting surface skin for an aircraft, comprised of:

first and second composite fibre and matrix materials, said materials exhibiting first and second tensile modulae, respectively, said second material tensile modulus is smaller than said first material tensile modulus, wherein said first material includes fibres of a first type and the second material includes fibres of a second type, the fibres of the second type having a tensile modulus smaller than the tensile modulus of the fibres of the first type; and at least one opening is provided in the lower wing skin and, wherein a portion of the wing skin bounding the opening is said second composite fibre and matrix material.

17. A lower lifting surface skin according to claim 16, in which the second composite fibre and matrix material includes both fibres of the first type and fibres of the second type.

18. A lower lifting surface skin according to claim 16, in which the second material includes a plurality of layers of fibres, and fibres of the second type are present in only some of the layers.

19. A lower lifting surface skin according to claim 16, in which the second material includes fibres extending in a plurality of different directions and fibres of the second type all extend in the same direction.

20. A lower lifting surface skin according to claim 19, in which substantially all the fibres of the first type extend in directions other than the direction in which the fibres of the second type extend.

21. A lower lifting surface skin according to claim 16, in which the fibres of the first type are carbon fibres.

22. A lower lifting surface skin according to claim 16, in which the fibres of the second type are glass fibres.

23. A lower lifting surface skin according to claim 16, in which the second composite fibre and matrix material surrounds the opening.

24. A lower lifting surface skin according to claim 16, in which the thickness of the portion of the skin formed of the second composite fibre and matrix material is substantially the same as the thickness of the neighbouring portion of the skin formed of the first composite fibre and matrix material.

25. A lower lifting surface skin according to claim 16, in which the opening has an area greater than $10^4$ mm2 and the second composite fibre and matrix material extends across a width greater than 400 mm.

26. A lower lifting surface skin according to claim 16, in which the lower lifting surface skin is a wing lower surface skin and said opening is a manhole in the wing lower surface skin.

27. A structural component according to claim 26, in which the second composite fibre and matrix material extends transversely outwardly from the manhole partway towards edges of the wing lower surface skin.

28. A lower lifting surface skin according to claim 26, in which a plurality of manholes are provided, each bounded by the second composite fibre and matrix material.

* * * * *